United States Patent Office 2,812,351
Patented Nov. 5, 1957

2,812,351
METHOD OF PREPARING BUTYLAMINES-2 DISUBSTITUTED IN 4-POSITION BY HYDROXYLATED AROMATIC RADICALS

Georges Joseph Lambert Dechamps, Etterbeek, Brussels, and Fernand Aime Ghislain Binon, Brussels, Belgium, assignors to Societe des Laboratoires Laboz, Brussels, Belgium No Drawing. Application May 4, 1954, Serial No. 427,658

Claims priority, application Belgium May 18, 1953

7 Claims. (Cl. 260—570)

This invention relates to a process for preparing butylamines-2 substituted in 4-position by two aromatic radicals each bearing a hydroxy group in the para position and to novel compounds obtained in the course of the preparation. More particularly, it relates to a process for preparing 4,4-di-(4'-hydroxy-aryl)-butylamine-2 and hydrohalides thereof wherein the aromatic rings may be further substituted with alkyl, alkoxy, and/or inorganic functions such as halogen, nitro, and the like.

The practical value of compounds of this type, wherein the two aromatic radicals are substituted in the para position by a hydroxy group, lies in the fact that they are recognized as possessing hypotensive properties which corresponding compounds substituted in the ortho position, do not possess to the same degree.

Furthermore, some of the intermediate products obtained in the preparation of the butylamines-2 disubstituted in 4-position by hydroxylated aromatic radicals are active as anti-extrasystolic agents.

The preparation of these substances which are readily oxidized and difficult to handle, involves an indirect approach which constitutes one of the novel characteristics of the method.

The procedure for obtaining butylamines-2 disubstituted in 4-position by hydroxylated aromatic rings, according to the present invention, follows three stages:

In the first stage, a butanone-2 is prepared, disubstituted in 4-position by two aromatic rings each bearing a phenolic hydroxyl function, at least one of which is protected in the form of an alkoxy, e. g. methoxy group. This type of butanone is obtained by condensing, under given conditions, unsaturated α-β ketones of the anisalacetone type, with phenols.

In the second stage, these butanones, disubstituted in 4-position, are transformed into the corresponding butylamines-2 by transforming the >CO group into

>CH—NH₂ for example by treatment with ammonia and hydrogen.

It is the compounds obtained in this second stage which are anti-extrasystolic.

The course of the synthesis may be schematically represented as follows:

CH₃—O—R—CH=CH—C—CH₃ + R'OH ⟶
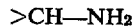

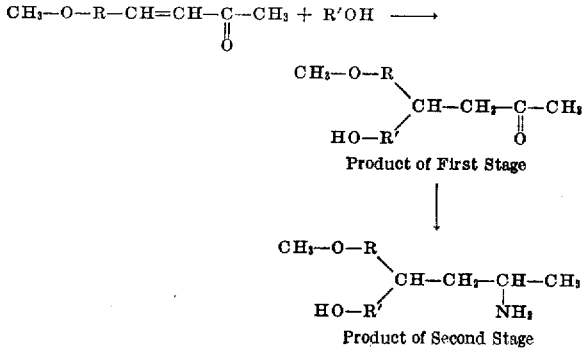

Product of First Stage

↓

Product of Second Stage wherein R and R' are aromatic nuclei possibly containing other substituents.

With regard to the first stage, i. e. the condensation of unsaturated compounds with phenols, it is known that some of these substances such as styrene, idene, acrolein, vinyl acetate, cinnamic acid, the unsaturated carboxylic acids or the unsaturated α-β ketones, the terpenes, etc., can be condensed with the phenols in the presence of certain catalysts such as H₂SO₄, HF, BF₃, AlCl₃, and the like.

When applied to the preparation of butanones-2, disubstituted in 4-position, of the type:

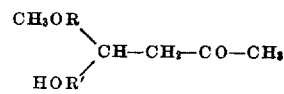

as hereinabove defined, this method has so far proved unsatisfactory from the point of view of yield, as a result of secondary polymerization reactions of the unsaturated α-β ketones present.

The process according to the present invention improves the yield:

(1) By establishing the order in which the products taking part in the reaction, particularly the catalysts, are added;

(2) By establishing the strict conditions of temperature in which the reaction must take place in order to reduce secondary reactions to the minimum, particularly substitution in the ortho position and the polymerization processes of the unsaturated α-β ketones used.

With respect to the catalysts, which serve not only to increase the reactivity of the hydrogen on the phenolic nucleus but also to activate the double bond of the unsaturated ketone, it is known that these effects can be achieved, for example, with sulphuric acid and benzoyl peroxide in that order.

It has now been found, however, that to obtain a good yield, the benzoyl peroxide must be introduced before the sulphuric acid. Other organic peroxides may be similarly employed and the sulphuric acid may be replaced by other condensation catalysts heretofore employed.

With regard to temperature conditions, it is known that in order to achieve the addition of the phenols to the unsaturated α-β ketones in question through the para rather than the ortho hydrogen in relation to the phenolic hydroxyl, a sufficiently high temperature must be used. Too high a temperature, however, involves the danger of provoking an uncontrollable reaction and of polymerization of the unsaturated α-β ketone present. By the process of the present invention, the catalysts are added at well-defined temperatures (80°–90° C. for benzoyl peroxide; about 100° C. for sulphuric acid) and the reaction is completed at a higher temperature (about 110° C.) which is easily controlled under these conditions.

This improved method is applicable in the process of condensing the most varied series of phenols with ketones of the type R—CH=CH—CO—CH₃ where R is an aromatic radical, possibly substituted by functions such as CH₃O—, Cl, Br, CH₃, N(CH₃)₂, etc., which condensation results in the formation of products such as the disubstituted butanones, originating from benzalacetone or its substitution products, and from monophenols such as phenol proper, cresols, α- or β-naphthols, and other aromatic compounds containing a nuclear phenolic hydroxy group.

As non-limiting examples, there may be cited the condensation products of benzalacetone and o-cresol, anisalacetone and phenol, anisalacetone and o-cresol, o-chlorobenzalacetone and o-cresol, p-dimethylaminobenzalacetone and o-cresol, etc. The following procedures are illustrative of this phase of the invention:

EXAMPLE I (A) *Condensation of anisalacetone and o-cresol to form 4 (4'-methoxyphenyl)-4 (4'-hydroxy-3'-methylphenyl)-butanone-2.*

Into a 2-litre flask, fitted with a reflux condenser, an immersion thermometer, and a stirrer, there are introduced 525 g. (3 M) of anisalacetone and 648 g. (6 M) of o-cresol in 750 cc. of toluene. The temperature is brought to 80° C. and 17 g. of benzoyl peroxide are added in small quantities while a temperature of 90° C. is maintained. The mixture is heated from time to time and stirred (the process of adding takes about half-an-hour) and then heated progressively to 100° C. When the temperature of the mixture no longer tends to rise spontaneously, 6.5 g. $H_2SO_4$ (3.6 cc.) are added dropwise, while the temperature is maintained at exactly 100° C. to avoid an uncontrollable reaction. When all the acid has been added (about half-an-hour), the temperature is gradually brought up to boiling, the mixture refluxed for 7 hours and poured while still hot into 2 litres of a 10% aqueous solution of $Na_2CO_3$. The product is decanted, the toluene layer washed while hot with dilute HCl and the solvent distilled, at first under atmospheric pressure, then in a vacuum. In this way, the following are obtained:

Up to 150° C./15mm.: 295 g. of o-cresol recovered
Between 150 and 200° C./15 mm.: 165 g. of intermediate fraction
Between 200 and 280° C./15 mm.: 570 g. of crude condensation product (oil)
Over 280° C./15 mm.: 140 g. of tails.

Rectification of the fraction distilling between 200 and 280° C./15 mm. gives the following:

Up to 224° C./10 mm.: a fraction of oily head, which, by crystallization in a mixture of benzene and cyclohexane, yields 27 g. of 4 (4'-methoxyphenyl)-4 (2'-hydroxy-3'-methylphenyl)-butanone-2 having a melting point of 114° C. (condensation product in ortho position to the phenolic hydroxy function).

Between 224 and 234° C./10 mm.: 450 g. of an oily fraction which after dissolution in 500 cc. of hot benzene and the addition after cooling of 500 cc. of cyclohexane gives on being filtered under vacuum 262 g. of white crystals with a melting point of 126° C. (after recrystallization in 500 cc. of benzene): 4(4'-methoxyphenyl)-4-(4'-hydroxy-3'-methylphenyl)-butanone-2 (condensation product in para position to the phenolic hydroxy function).

Over 250° C./15 mm.: a fraction of tails, unidentified.

(B) *Condensation of o-cresol and benzalacetone to form 4-phenyl-4-(4'-hydroxy-3'-methylphenyl)-butanone-2*

Into a 250 cc. flask, fitted with a reflux condenser and stirrer, are introduced 0.4 M, i. e. 43 g. of o-cresol, 0.28 M, i. e. 41 g. of benzalacetone, and 200 cc. of toluene. The temperature is raised to 80° C. and maintained at this level while 20 g. of benzoyl peroxide are added little by little. When this operation is finished, the mixture is brought up to 100° C. and 2 cc. $H_2SO_4$ added dropwise. The mixture is then refluxed for 5 hours, washed with a solution of $Na_2CO_3$, then with dilute HCl, decanted and rectified.

After removal at 200° C./16 mm. of the unreacted reagents, 25 g. of a red oil are obtained boiling between 200 and 260°C./16 mm., from which 7 g. of colorless crystals (m. p. 132° C.) are recovered by crystallization in a mixture of equal quantities of benzene and cyclohexane.

(C) *Condensation of phenol and anisalacetone to form 4(4'-methoxyphenyl)-4(4'-hydroxyphenyl)-butanone-2*

To 50 g. of anisalacetone (0.28 M) and 53 g. of phenol (.56 M) in 200 cc. of toluene, there are added 20 g. of benzoyl peroxide at 80° C., then at 100° C., 2 cc. $H_2SO_4$; the mixture is refluxed for 5 hours and washed with $Na_2CO_3$, then with dilute HCl. After recovery of the unreacted reagents, the mixture is distilled at about 260° C./15 mm. and 65 g. of oil are obtained, which upon dissolution in benzene and cyclohexane yield on crystallization 25 g. of colorless crystals (M. P. 128° C.).

Under similar operative conditions, the following condensations may be effected:

(D) o-Chlorobenzalacetone and o-cresol to form 4(2'-chlorophenyl)-4(4'-hydroxy-3'-methylphenyl) - butanone-2; M. P. 117° C.

(E) Vanillalacetone and o-cresol to form 4(4'-hydroxy-3'-methoxyphenyl)-4(4'-hydroxy-3'-methylphenyl) - butanone-2; B. P. 270–280° C./13 mm.

(F) Piperylideneacetone and o-cresol to form 4(3',4'-methylenedioxyphenyl) - 4(4'-hydroxy-3'-methylphenyl)-butanone-2; M. P. 147° C.

(G) Veratrylideneacetone and o-cresol to form 4(3',4'-dimethoxyphenyl)-4(4'-hydroxy-3'-methylphenyl) - butanone-2; M. P. 144° C.

(H) Benzalacetone and β-naphthol to form 4(2'-hydroxynaphthyl-6')-4-phenyl-butanone-2; B. P. 290–315° C./1.5 mm.

In the second stage, the disubstituted butanones thus obtained are converted by amination into butylamines-2 disubstituted in 4-position, for example, by reaction with ammonia and hydrogen, with formamide or with ammonium formate.

EXAMPLE II (A–1) *4(4'-methoxyphenyl)-4(4'-hydroxy-3'-methylphenyl)-butylamine-2(anti-extrasystolic agent)*

Into a 750 cc. container there are introduced 100 g. (0.34 M) of 4(4'-methoxyphenyl)-4(4'-hydroxy-3'-methylphenyl)-butanone-2 and 86 g. (1.36 M) of ammonium formate. The temperature is brought up to 140° C. and maintained at this level for 3 hours until the mixture of the two initial layers is completely homogeneous. The temperature is then raised progressively to 180° C. (in about one hour) and maintained for 5 hours. When a thin stream of the mixture is poured while still hot into cold water, 115 g. of crude formylated derivative of 4(4'-methoxyphenyl)-4(4'-hydroxy-3'-methylphenyl)-butylamine-2 are obtained.

This crude product can be hydrolized directly without previous purification. Hydrolysis is effected by heating the product under a reflux condenser in 500 cc. of concentrated HCl and 1 litre of $H_2O$ for 8 hours. The product is then diluted in 3 litres of water, the hydrochloride solution removed by filtering and the free amine precipitated by NaOH.

In this way, 46.8 g. of 4(4'-methoxyphenyl)-4(4'-hydroxy-3'-methylphenyl)-butylamine-2 are obtained: M. P. 119° C.

By similar methods of conversion, the following may be prepared from the butanones previously described:

(A–2) From the ortho compound prepared in Example I (A), there is obtained 4(4'-methoxyphenyl)4(2'-hydroxy-3'-methylphenyl)-butylamine-2; M. P. 97° C.

(B) 4-phenyl-4(4'-hydroxy-3'-methylphenyl)-butylamine-2; M. P. 92° C.

(C) 4(4' - methoxyphenyl) - 4(4' - hydroxyphenyl)-butylamine-2; M. P. 88° C.

(D) 4(2' - chlorophenyl) - 4(4' - hydroxy - 3' - methylphenyl)-butylamine-2; M. P. 109° C.

(E) 4(4'-hydroxy-3'-methoxyphenyl)-4(4'-hydroxy-3'-methylphenyl)-butylamine-2; M. P. 135° C.

(F) 4(3',4'-methylenedioxyphenyl)-4(4'-hydroxy-3'-methylphenyl)-butylamine-2; M. P. 139° C.

Other methods for converting a carbonyl group to a primary amine may similarly be utilized in this second stage.

The novelty of the present invention is constituted by the following elements:

(a) The different processes, taken as a whole, which are used in the preparation of derivatives of the type of the butylamines-2 disubstituted in 4-position by aromatic radicals, also possibly substituted, together with the process used for preparing the derivatives occurring as intermediate products.

The principal technical advantage offered by the present invention, as regards the addition of phenols to unsaturated α-β ketones, lies in the simultaneous use of two types of catalysts of which one increases the reactivity of the hydrogen on the phenolic nucleus and the other activates the double bond of the unsaturated ketone. Each pair of catalysts which may be employed for this twofold purpose necessitates a specific temperature; the values given herein as examples are valid only for benzoyl peroxide and sulphuric acid, which were considered for technical reasons to be the most suitable catalysts for the purpose, but are not intended to be limitative.

The importance of specifying the conditions of temperature for each pair of catalysts arises from the necessity of ensuring the best conditions for each catalyst in order to limit the formation of condensation products in the ortho position, and to avoid the polymerization to which the unsaturated α-β ketone is prone. The nature of the solvent (and particularly its boiling point) as well as the need for the solvent itself are dictated by the same considerations which render it necessary to contain the reaction within the limits wherein the maximum yield is assured.

The examples relative to benzalacetones in which no alkoxy group is present, such as benzalacetone and chlorobenzalacetone are intended to illustrate the general technical value of the processes referred to immediately above and are independent of specifications which are elsewhere given in connection with those structures characterized by antiextrasystolic or hypotensive properties. Similarly, the fact that in the process of condensing the β-naphthol with the benzalacetone, the union of the two molecules occurs on the amphi position of the β-naphthol, is quite independent of the stipulation made elsewhere that substitution in the para position by hydroxylated or alkoxy aromatic radicals, is necessary to obtain hypotensive or antiextrasystolic properties.

(b) The second point of novelty of the present invention relates more particularly to the fact that derivatives possessing marked antiextrasystolic properties may be obtained, namely the butylamines-2 disubstituted in 4-position by aromatic radicals which, in addition to other possible substitutions, include at least one alkoxy function in the para position on one of the nuceli and a hydroxylated function in the para position on the other.

The examples given which relate to substitution by a methoxy group in the para position are dictated by considerations of technical convenience and in no way limit the value of the substitution in the para position by other alkoxy functions as a means of obtaining a marked antiextrasystolic action.

(c) The third point of novelty of the present invention relates more particularly to the fact that derivatives possessing marked hypotensive properties may be obtained, namely the butylamines-2 disubstituted in 4-position by aromatic radicals which, in addition to other possible substitutions, include at least one hydroxylated function in the para position on each of the aromatic nuclei.

Various changes and modifications may be made without departing from the spirit and scope of the present invention and it is intended that such obvious changes and modifications be embraced by the annexed claims.

What is claimed is:

1. The process for preparing a compound of the formula

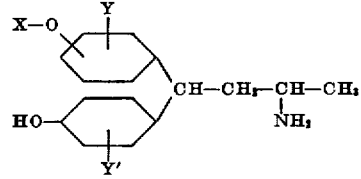

wherein Y and Y' are each a radical selected from the group consisting of lower alkyl, lower alkoxy, halo and hydrogen, and X is methyl, which comprises heating a mixture of

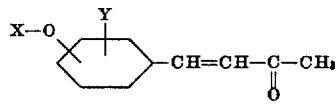

and

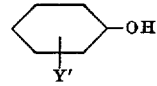

wherein X, Y, and Y' have the foregoing definitions, at a temperature of about 80 to about 90° C. in the presence of benzoyl peroxide as catalyst, adding a condensation catalyst selected from the group consisting of sulphuric acid, hydrofluoric acid, boron trifluoride and aluminum chloride, heating the mixture at a higher temperature below 110° C., raising the temperature to about 110° C. to form

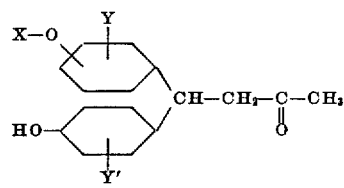

and converting the resulting ketone to the amine by the Leuckart reaction.

2. The process for preparing a compound of the formula

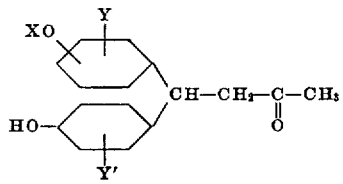

wherein Y and Y' are each a radical selected from the group consisting of lower alkyl, lower alkoxy, halo and hydrogen, and X is methyl, which comprises heating a mixture of

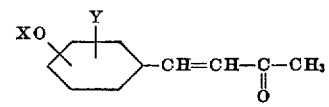

and

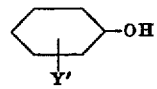

wherein X, Y and Y' have the foregoing definitions, at a temperature of about 80 to about 90° C. in the presence of benzoyl peroxide as catalyst, adding a condensation catalyst selected from the group consisting of sulphuric acid, hydrofluoric acid, boron trifluoride and aluminum chloride, heating the mixture at a higher temperature below 110° C. and raising the temperature to about 110° C.

3. The process for preparing 4(4'-methoxyphenyl)-4(4'-hydroxy-3'-methylphenyl)-butanone-2 which comprises heating a mixture of o-cresol and anisalacetone at a temperature of about 80 to about 90° C. in the presence of benzoyl peroxide as catalyst, adding sulfuric acid as condensation catalyst at a temperature of about 100° C., and thereafter heating at a temperature of about 110° C.

4. The process for preparing 4(4'-methoxyphenyl)-4(4'-hydroxyphenyl)-butanone-2 which comprises heating a mixture of phenol and anisalacetone at a temperature of about 80 to about 90° C. in the presence of benzoyl peroxide as catalyst, adding sulfuric acid as condensation catalyst at a temperature of about 100° C., and thereafter heating at a temperature of about 110° C.

5. The process for preparing 4(4'-hydroxy-3'-methoxyphenyl)-4(4'-hydroxy-3'-methylphenyl)-butanone-2 which comprises heating a mixture of o-cresol and vanillalacetone at a temperature of about 80 to about 90° C. in the presence of benzoyl peroxide as catalyst, adding sulfuric acid as condensation catalyst at a temperature of about 100° C., and thereafter heating at a temperature of about 100° C.

6. The process for preparing 4(3',4'-methylen-dioxyphenyl)4(4'-hydroxy-3'-methylphenyl)-butanone-2 which comprises heating a mixture of o-cresol and piperylideneacetone at a temperature of about 80 to about 90° C. in the presence of benzoyl peroxide as catalyst, adding sulfuric acid as condensation catalyst at a temperature of about 100° C., and thereafter heating at a temperature of about 110° C.

7. The process for preparing 4(3',4'-dimethoxyphenyl)-4(4'-hydroxy-3'-methylphenyl)-butanone-2 which comprises heating a mixture of o-cresol and veratrylideneacetone at a temperature of about 80 to about 90° C. in the presence of benzoyl peroxide as catalyst, adding sulfuric acid as condensation catalyst at a temperature of about 100° C., and thereafter heating at a temperature of about 110° C.

References Cited in the file of this patent

UNITED STATES PATENTS

| 1,432,291 | Hinsberg | Oct. 17, 1922 |
| 2,603,661 | Bruce et al. | July 15, 1952 |
| 2,661,373 | Kulz et al. | Dec. 1, 1953 |

FOREIGN PATENTS

| 622,659 | France | June 3, 1927 |
| 536,881 | Great Britain | May 30, 1941 |
| 1,001,547 | France | Feb. 25, 1952 |

OTHER REFERENCES

Goodson et al.: "Jour. Am. Chem. Soc." (1949), vol. 71 pp. 3219–21.

Dankova et al.: "Chem. Abst." (1915), vol. 45, p. 9518.

Uu-Hoi et al.: "Jour. Org. Chem." (1952), vol. 17, pp. 1122–7.

UNITED STATES PATENT OFFICE

CERTIFICATE OF CORRECTION

Patent No. 2,812,351            November 5, 1957

Georges Joseph Lambert Dechamps et al.

It is hereby certified that error appears in the above numbered patent requiring correction and that the said Letters Patent should read as corrected below.

In the grant, lines 3 and 13, and in the heading to the printed specification, line 7, name of assignee, for "Societe des Laboratories Laboz", each occurrence, read -- Societe des Laboratoires Labaz --.

Signed and sealed this 31st day of January 1961.

(SEAL)
Attest:

KARL H. AXLINE
Attesting Officer

ROBERT C. WATSON
Commissioner of Patents